United States Patent [19]
Szekessy

[11] 3,875,559
[45] Apr. 1, 1975

[54] CIRCUIT SYSTEM FOR BRAKE LIGHTS

[75] Inventor: Istvan Szekessy, Munich, Germany

[73] Assignee: Rexroth und Szekessy Entwicklung GmbH, Munich, Germany

[22] Filed: Mar. 21, 1973

[21] Appl. No.: 343,259

Related U.S. Application Data

[63] Continuation-in-part of Ser. No. 190,071, Oct. 18, 1971, Pat. No. 3,740,715.

[52] U.S. Cl. ................................. 340/71, 340/94
[51] Int. Cl. ............................................. B60q 1/26
[58] Field of Search ............ 340/56, 66, 72, 71, 93, 340/94, 69

[56] References Cited
UNITED STATES PATENTS

| | | | |
|---|---|---|---|
| 2,288,747 | 7/1942 | Santora | 340/66 |
| 2,971,067 | 2/1961 | Ticknor | 340/72 X |
| 3,214,732 | 10/1965 | Young | 340/71 UX |
| 3,431,556 | 3/1969 | Johnson | 340/72 |
| 3,434,106 | 3/1969 | Lawless | 340/61 X |
| 3,501,742 | 3/1970 | Ellison | 340/66 UX |
| 3,568,146 | 3/1971 | Knez | 340/72 |
| 3,576,527 | 4/1971 | Howard | 340/67 |
| 3,697,982 | 10/1972 | Kawaki et al. | 340/384 E |
| 3,702,459 | 11/1972 | Bauchan | 340/62 |
| 3,740,715 | 6/1973 | Szekessy | 340/72 |

Primary Examiner—John W. Caldwell
Assistant Examiner—Marshall M. Curtis
Attorney, Agent, or Firm—Hopgood, Calimafde, Kalil, Blaustein & Lieberman

[57] ABSTRACT

A brake-light system is provided comprising control means incorporated in a vehicle circuit which includes at least two brake lights of different colors, a switch and a voltage source, the control means being made operational to control lights of both colors, with at least one light color being presented in accordance with a program of intensity variation.

14 Claims, 13 Drawing Figures

3,875,559
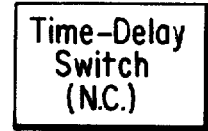
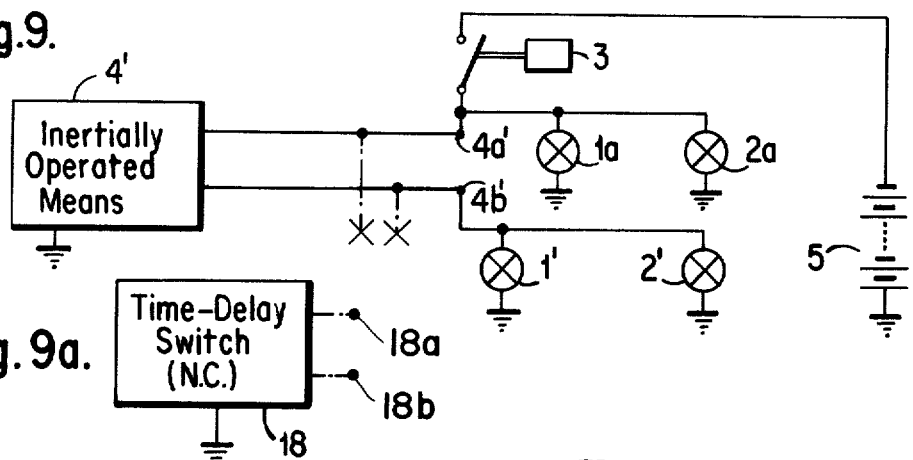
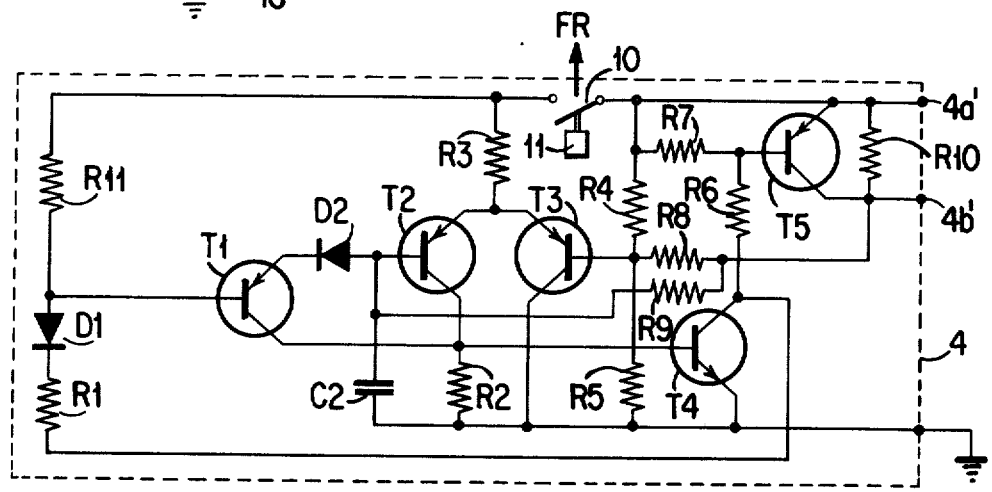
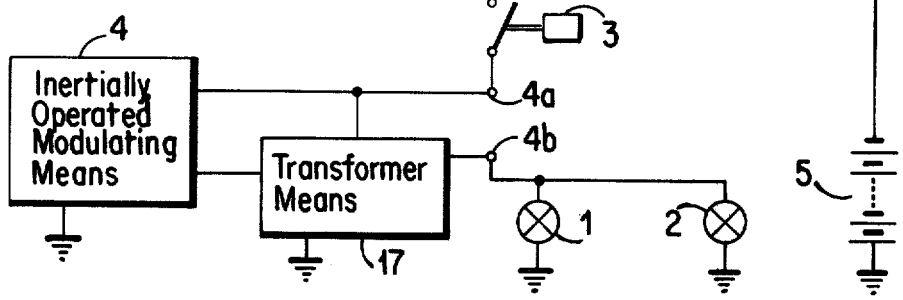
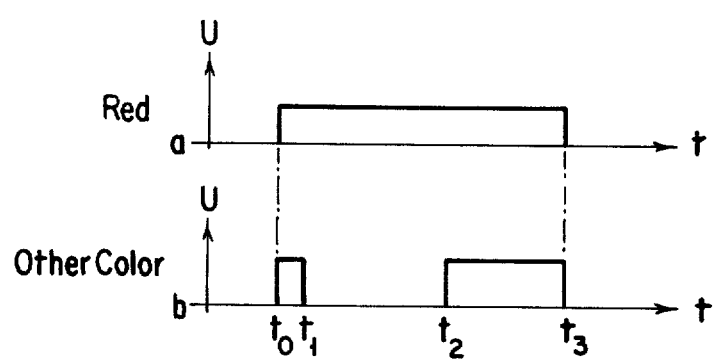

CIRCUIT SYSTEM FOR BRAKE LIGHTS

This application is a continuation-in-part of my copending application Ser. No. 190,,071, filed Oct. 18, 1971 (now U.S. Pat. No. 3,740,715).

The invention relates to a circuit system for brake lights of motor vehicles or the like in which the brake light may be connected to a voltage supply through a switch actuated by the brake pedal.

A circuit system of this kind is already broadly known. Its purpose is to provide optical information to the road user behind the braking vehicle that the vehicle is in process of braking so that the driver of a vehicle disposed behind the braking motor vehicle may take the necessary action and, for example, operate the brake pedal in his vehicle or commence a diversionary maneuver. The brake lights are automatically illuminated when the brake pedal is actuated so that the driver of the braking motor vehicle need not separately actuate a switch for operating the brake light.

Since motor vehicles are provided at the rear not only with brake lights but also with other lights, for example, rear lights which are switched on in darkness or in poor visibility, both lights have been provided with different colors to differentiate between brake lights and rear lights, for example, by arranging for the brake lights to be illuminated in an amber color tone while the other rear lights are illuminated in a red color tone. Moreover, in order to provide better recognition of brake lights, they are operated with a higher illumination intensity than rear lights so that braking can be very clearly signalled to the road user disposed behind the braking vehicle. However, since the prior art also discloses rear lights with a very high illumination intensity, for example for travelling in fog, it follows that the effect of differentiated illumination intensity is often impaired or reduced.

The prior art as already known discloses circuit systems to reduce the risk of rearward collision, such systems making use of optical means in order to clearly indicate braking to the driver travelling behind the vehicle which is braking. For example, it is known for a greater or lesser number of brake lights, disposed as a light cluster, to be switched-on, relative to the degree of deceleration. However, the costs are very high. It is also known to convert the degree of deceleration into the operating frequency of a known switch, provided with negative temperature coefficient conductors for the rhythmic switching off of the electric brake light circuit; frequency changes, in particular continuous frequency changes, do not, however, represent a very clear optical signal. It is also known for electromechanical or electronic circuits to cause the brake lights to flash during the entire braking operation, and, to this end, in particular, having the right-hand brake light illuminated when the left-hand brake light is extinguished and vice versa. The continuous flashing is undesirable, particularly in view of the modern system of flashing parking lights. The prior art also discloses circuit systems in which particularly high degrees off acceleration are additionally optically indicated.

In order to have simple means for counteracting the risk of rearward collision accidents, it is the object of the invention to signal the braking operation even more clearly and unambiguously to a road user positioned behind a braking motor vehicle.

According to the invention, this problem is solved by incorporating a brake-light modulator into the circuit comprising the brake lights, switch and voltage source, the said modulator becoming operational for a defined modulation period when the switch is closed and being adapted to repeatedly vary the illumination intensity of the brake lights.

The function of the brake light modulator is to substantially vary the illumination intensity, the color tone or like signalling functions of the brake lights, generally only at the beginning of the braking operation, the brake light being maintained in continuous illumination to the end of the braking operation so that the road user positioned behind the braking vehicle is better informed than hitherto by the fluctuating signalling functions regarding the beginning of deceleration of the vehicle. If the driver of a vehicle which follows a braking motor vehicle does not constantly observe the lights disposed on the rear of the preceding vehicle, it was hitherto easily possible to overlook the moment at which the brake lights began to be illuminated. The sudden illumination of the brake lights, particularly in daylight and in good visibility, is a very distinct signal, while the constant continuous illumination of the brake light is noted by the observer rather less readily. For example, if the brake lights are very brightly illuminated by incident sunlight, there is a risk that brake lights, having been switched on and emitting light at a continuous illumination intensity, are not noticed at all. Finally, there may be some doubt whether the preceding vehicle is being braked or whether the driver of the said vehicle has merely switched on the rear lights; such doubt may characterize the instant of time when the driver of the following vehicle has noticed the fact of switching on, that is to say, the illumination of the lights disposed on the rear of the preceding vehicle. Such difficulties do not occur when using the invention. In particular, repeated fluctuation of the illumination intensity when the brake lights are switched on is a distinct feature which differentiates against the moment of switching on the rear lights and remains a clear differentiating feature even if the brake lights are attenuated due to substantial sunlight illumination. Moreover, defining the modulation period with respect to time ensures that the initially mentioned disadvantages, relating to othe prior art, do not occur. According to the invention, modulation in the form of brightness modulation, colortone modulation or light modulation is limited to the critical period of possible doubt and cannot, therefore, be mistaken with conventional flashing warning lights of stationary or moving traffic.

In order to signal the braking operation as instantaneous as possible, it is appropriate for the brake-light modulator to come into action immediately when the switch is closed so that the brake-light modulator varies the illumination intensity of the brake light immediately and appropriately repeatedly, beginning with the bright phase. If the driver of the following vehicle overlooks the beginning of the braking operation and looks in the direction of the braking vehicle only a short time later, his attention will still be drawn to the brake-indicating function of the lights since the illumination intensity thereof still fluctuates and they are not, as hitherto, continuously illuminated with a certain illumination intensity level.

The brake-light modulator varies the voltage supplied to the brake lights in intervals and/or in waves.

This action may be performed by a resistor being briefly connected into the circuit. It is also possible for the brake light circuit to be repeatedly interrupted, a function which may be performed by the brake-light modulator through the switching on and off a switch.

Particularly distinct signals will be obtained if the brake-light modulator supplies the brake lights with brief voltage pulses, the peak values of which enable higher illumination intensities to be achieved than the illumination intensity in conventional braking. Owing to the short period of the voltage pulses, there is no risk of the filaments ofo the brake lights of fuses of the appropriate circuit burning through. In this embodiment of the invention, it is appropriate for the duration of the voltage pulses with respect to their maxima, that is to say, the energy content comprising voltage and time (i.e., duty cycle) to be dimensioned in accordance with the load-bearing capacity ofo the filaments or fuses.

The modulation period preferably begins with a maximum of the voltage wave, pulse or the like and not with a minimum of the voltage wave, pulse interval or the like, since substantial differences in signalling means are noticed most rapidly and reliably. It is also advantageous in some cases for the amplitude of illumination intensity fluctuation to be varied during modulation. The modulation frequency is constant.

According to another embodiment of the invention, the previously described brake-light modulator additionally comes into action with severe braking operation in that it modulates continuously during the entire time period for which severe braking is applied, in which case the modulation frequency may be equal to or different from the frequency of the initial modulation. If desired, different maximum amplitude may be used for modulation to indicate different modulation times, for example, a first such amplitude for the brief "beginning" period, and a second such amplitude for the period of "severe" braking.

In particular, this further embodiment of the invention incorporates a delay transmitter for the brake-light modulator in which severe deceleration forces are accomplished by the motion of a mass beyond a limiting position, thus actuating a switch.

In this way, it is possible to signal to the road user positioned behind the vehicle, not only the beginning of a braking operation, namely by repeated, for example, different illumination of the brake lights, but also to transmit identical optical signals if the preceding motor vehicle brakes particularly severely. In this circumstance, the following road user also benefits by his attention being drawn to the beginning of the braking operation of a preceding vehicle. In the sense of the above mentioned problem, it is also appropriate to specially draw tne attention of the following road user if the preceding vehicle brakes particularly strongly since such severe braking is accompanied by a rapid reduction of the distance between the said vehicle and the following vehicle. Delayed knowledge of the fact that motor vehicle has begun to brake particularly intensively, i.e., knowledge only after lapse of a given period of time after the beginning of the braking operation, frequently leads to rear-end collision accidents; for example, even though the following road user may adjust himself to decelerations at the beginning of the braking operation of the preceding vehicle, he is often not able to determine when the said vehicle has begun to brake more intensively. This defect has often led to rear-end collision accidents; but with the invention said defect may be counteracted in a simple and inexpensive manner.

In the above-mentioned, know, frequency-modulated system in which the electric brake light circuit is switched off rhythmically, there is also a risk of mistakes with motor vehicles, the warning flashes of which are switched on and which are parked by the roadside. If a travelling motor vehicle increases its braking force and if this operates in accordance with the known brake modulation system, changing from slow flashing to more rapid flashing (with intensive braking operation), the frequency of the slow flashing will correspond approximately to the frequency of the warning flashers of a stationary motor vehicle. A road user travelling towards the hazard location is therefore not able to determine, at any rate from a substantial distance or in darkness, whether the motor vehicle disposed in front of him is stationary (slow flashing of the warning flashers) or is still travelling in the forward direction at a substantial speed (slow flashing with accompanies weak braking).

The invention avoids these disadvantages, in particular if the frequency at the beginning of the braking operation as well as in intensive braking operation remains the same and differs from the frequency of the warning flashers of stationary vehicles. It is, of course, possible for the frequency of the brake modulation of the circuit according to the invention to be approximately the same as that of warning flashers if differentiation between travelling and stationary vehicles is not necessary. Limitation of the modulation period, which may be adjustable, accompanied by light braking at any rate prevents constant modulation or the like over a prolonged period. Good differentiation between light braking (limited modulation period) and intensive prolonged braking (unlimited modulation period) is, however, simultaneously obtained by this method.

The invention may therefore be regarded as a tolerable warning system which operates with optimum reliability under practical conditions.

According to a further embodiment of the invention, it is preferred that the limiting position at which the member responding to deceleration actuates the switch be made adjustable, or that the switching time at which the brake modulator begins its action in response to the onset of severe braking ("incipient severe braking") be made adjustable. This adjustment will be frequently performed relative to the size and mass of the motor vehicle in which the circuit system of the invention is incorporated.

Accordingly, it is also possible for the switch itself or for the coupling between the switch and the member to be constructed in adjustable form.

To the extent to which differentiation between incipient braking as such and intensive braking is to be made possible, it is advisable for the switching means to actuate the brake modulator so that it varies the illumination intensity of the brake lights with a frequency different from that associated with incipient braking. If intensive braking is followed by weaker braking, in which case the delay (deceleration) transmitter is no longer in operation, it may also be advantageous if the initial modulation, limited with respect to time, once again follows the modulation of intensive braking.

Embodiments of the invention are explained hereinbelow by reference to the drawing in which:

FIG. 9 is a diagram similar to FIG. 1, to show a further embodiment;

FIG. 9A is a diagram to illustrate modification of FIG. 9 by addition of a component;

FIG. 10 is a diagram similar to FIG. 2, to show circuitry for use in FIG. 9;

FIG. 11 is a diagram, showing illustrative intensity-time intervals for uses of the circuit of FIG. 9; and FIG. 12 is another diagram similar to FIG. 1, but specifically applicable to the graphical presentation of FIG. 5.

Figure 1:
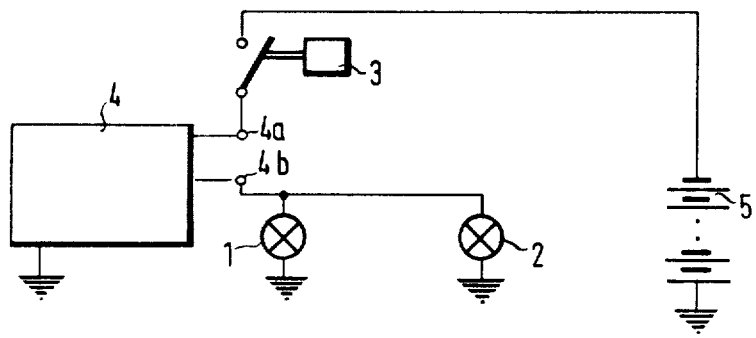
FIG. 1 is a schematic circuit diagram of a vehicle brakelight circuit into which a modulating system of the invention has been embodied.

In FIG. 1, a brake-light modulator 4 of the invention is connected at 4a—4b in series with brake lights 1-2 in the circuit comprising the said brake lights 1-2, the brake-pedal-operated switch 3, and the battery 5.

Figure 2:
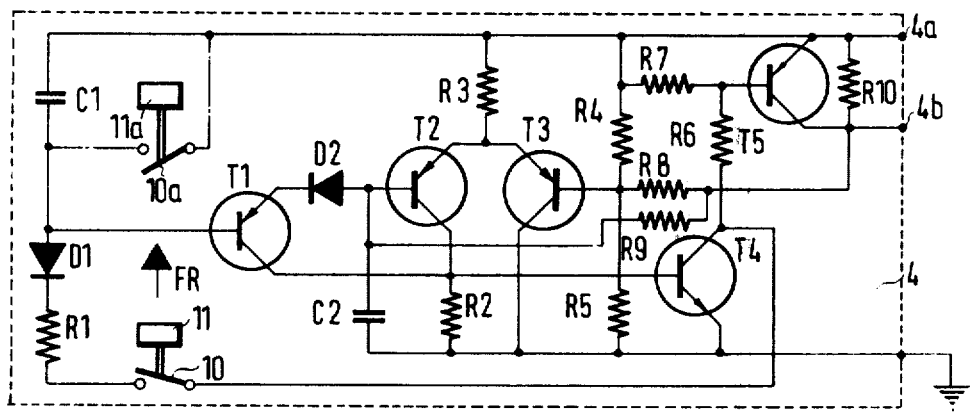
FIG. 2 is a more detailed circuit diagram to illustrate a unit-handling rake-light modulator package of the invention, the package being suggested by a dashed-enclosure.

In FIG. 2, the brake-light modulator 4 is seen to comprise a transistorized module which, as stated in connection with FIG. 1, is connected via terminals 4a-4b, between the brake lights 1-2 and the switch 3. The brake-light modulator 4 is shown ground-connected to the vehicle chassis.

Operation is as follows.

Operation of the brake pedal closes switch 3. Since the capacitor C2 will not as yet have any charge, the transistor T2 will become immediately conductive. It supplies the base current for the transistor T4 which switches on the transistor T5, said transistor allowing the required brake-light current to flow, so that the brake lights are energized at full intensity as soon as switch 3 is closed. A current will then flow across the resistor R8 to raise the base voltage of the transistor T3 to approximately 8 V, for the case of a 12 V battery 5. At the same time, the capacitor C2 will begin to be charged through the resistor R9 until the voltage at the base of the transistor T2 exceeds 8 V. This causes the transistor T2 to be driven to cut off.

Cut off of transistor T2 causes a current to flow in the reverse direction through resistor R8, and the base voltage at transistor T3 will then amount to approximately 4 V. Capacitor C2 will then once again be discharged, through resistor R9, until the voltage drops below 4 V. The transistor T2 will then once again be conductive, and the circuit will sweep back into the previously described state. The cycle duration of the sweep oscillation will be defined by the values of resistor R9 and capacitor C2.

The value of the resistor R10 will determine the minimum-intensity illumination level of brake lights 1-2, i.e., whether they are or are not illuminated, at intervals when transistor T5 is not switched on.

In an auxiliary or "latch" circuit, and whenever the brake lights 1-2 are switched on, the transistor T4 being conductive, a capacitor C1 will be charged in steps through a diode D1 and a resistor R1, until the base voltage at the transistor T1 amounts to approximately 6.5 V. Transistor T1 will then take up the base current of transistor T2 to prevent it being driven to cut off. Thereafter, and until switch 3 is opened, the circuit will remain in the steady state in which full current flows through the brake lights 1-2. The operating point of this latch circuit will be defined by the values of resistor R1 and capacitor C1, and the function of diode D2 is to admit current to transistor T1 in only one direction.

As a feature of the invention, intensive braking of the vehicle is detected and utilized to apply further modulating control to the brake-light circuit, at a switch 10. Switch 10 interrupts the auxiliary or latch circuit when a member, functioning as mass 11, is moved by intensive braking beyond a defined limiting position in the travelling direction FR, thus reinstating the described sweep oscillations, for as long as switch 10 remains oppen; alternatively, as indicated by dot-dash line connections (FIG. 2), switch 10 may be replaced by a switch 10a, for example in parallel to capacitor C1, the said switch 10a being normally open and being closed only by the inertia of a body 11a, in the circumstance of a predetermined minimum deceleration. The heavy arrow and adjacent legend FR, in connection with the package of FIG. 2, will be understood to be applied as an external marking on the package itself, such marking on the package being oriented consistent with the deceleration-response axis of the means 10-11; thus, upon installing the package in a vehicle, the installer-mechanic need only observe that he is correctly orienting the heavy arrow in the forward direction of the vehicle, when he secures the package to the vehicle frame.

Figure 3:
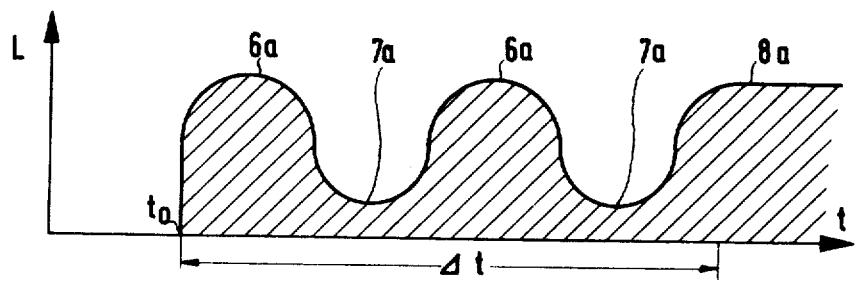
FIG. 3 is a diagram graphically illustrating an illumination-intensity time interval of the brake-lights, for an operation of FIGS. 1 and 2.

FIG. 3 shows brake-light illumination intensity L plotted with respect to time $t$. The driver steps on the brake pedal at the time $t_0$, and brake lights 1-2 immediately begin to be illuminated. Upon reaching a first maximum illumination intensity 6a, the voltage across brake lights 1-2 once again drops, causing brake lights 1-2 to be illuminated at a reduced intensity, followed by a next maximum 6a, which is again followed by a next minimum 7a, and finally followed by continuous llumination at full illumination intensity 8a. Suitable selection of circuit constants enables selection of the number of illumination minima 7a to be defined, before establishment of the steady level 8a, for the case of a normal application of brakes, i.e., representing something less than intensive braking. This level 8a will remain until the pedal switch 3 is opened.

Figure 4:
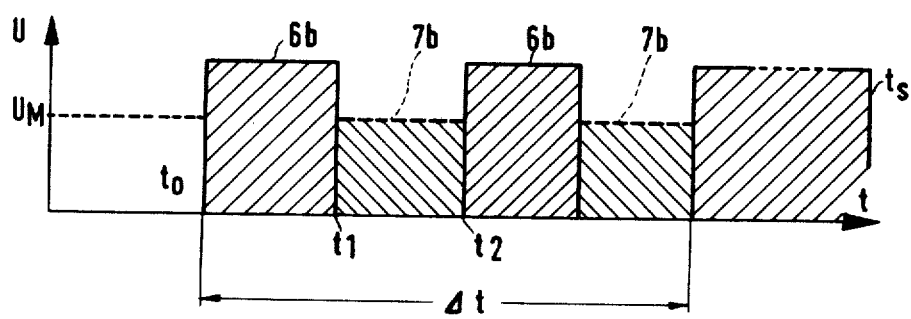
FIG. 4 is a similar diagram, illustrating the voltage-time relation for voltage suplied to the brake lights, and accounting for the illuminating-intensity situation of FIG. 3.

FIG. 4 shows brake-light voltage U plotted against time $t$, the maximum voltage 6b being applied to lights 1-2 at the switch-on instant $t_0$, i.e., when the brake pedal (with switch 3) is operated, and for a defined interval, to time $t_1$. The switch-on operation is represented by a square-wave pulse, in the interests of simplicity. At time $t_1$, the voltage drops from the voltage maximum 6b to the voltage minimum 7b until the brake light-modulator 4 automatically increases the voltage, at time $t_2$, to the voltage maximum 6b. This process is repeated several times, for the interval $\Delta t$. The voltage U may be either switched of entirely at the voltage minimum 7b or it may be set to a mean value $U_M$, depending upon the value selected for resistor R10. In general, it is advisable for the difference between the voltage maximum 6b and the voltage minimum 7b to be relatively great, for maximum visual response to the difference between illumination-intensity levels 6a -7a; and the use of dashed lines at $U_M$ and 7b will be understood to suggest the selectable feature. At time $t_n$, the brake pedal is once again released, and brake lights 1-2 are automatically switched off.

Figure 5:
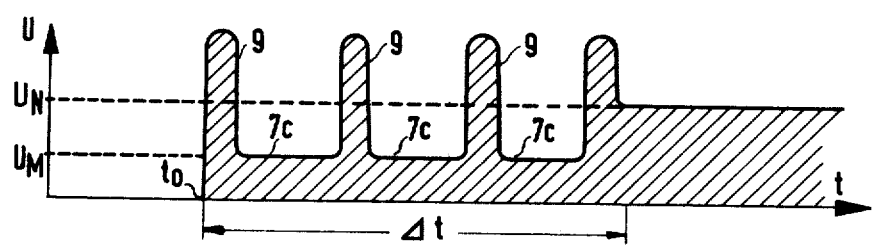
FIG. 5 is another such diagram, for a further voltage-time relation, accounting for an illumination-intensity situation as in FIG. 3.

FIG. 5 illustrates a modified pattern of voltage U applied to brake lights 1-2 as a function of time $t$. Normally, the brake lights 1-2 are excited at the normal voltage value $U_N$ when the brake pedal is operated. However, according to modification of FIG. 5, the brake-light modulator 4 may also produce short-period voltage pulses 9 when being switched on, the peak values off said pulses substantially exceeding the normal voltage value $U_N$ without, however, causing the filaments of the brake lights 1-2 or the fuses to burn through. The voltage applied between voltage pulses 9 to the brake lights 1-2 may drop to a mean voltage value $U_M$, said value being substantially below the normal voltage value $U_N$. Sufficient signalling is also obtained if the normal voltage value $U_N$ is obtained at the voltage minima 7c provided the brake lights can sufficiently express the voltage difference between the voltage amplitude of the voltage pulse 9 and the voltage amplitude in the voltage minima 7c virtue of their illumination intensity.

Figure 6:
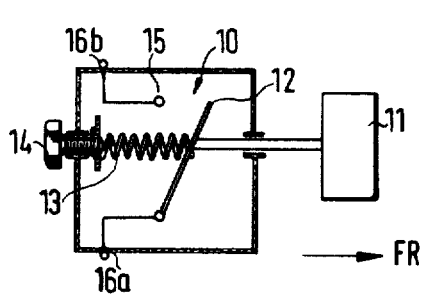
FIG. 6 is a simplified longitudinal sectional view of a delay or deceleration-responsive transmitter with switch, being a component of the FIG. 2 arrangement.

The switching means 10 according to FIG. 6 are shown merely in diagrammatic form. The mass 11, moved in the travelling direction FR during braking operation, is coupled through a rod to the switch contact bar 12, which, in turn, is coupled through a tension spring 13 to an adjusting screw 14, the purpose of which is to adjust the limiting position at which the contact bar 12 is lifted off the contact 15. The terminals 16a and 16b are disposed outside the switch.

Figure 7:
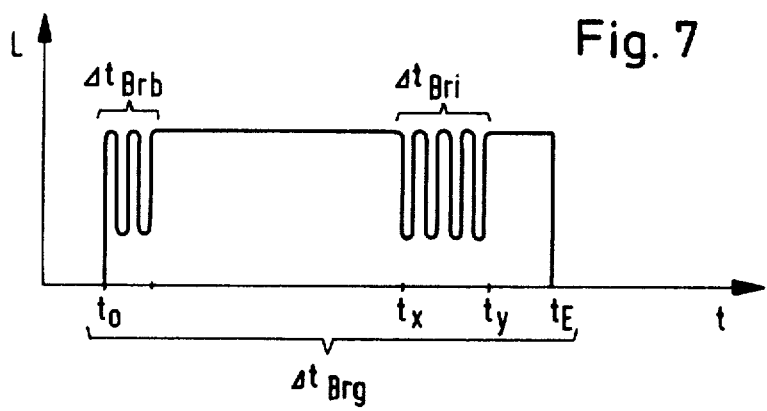
FIGS. 7 and 8 are further diagrams, for different illumination intensity-time intervals of the brake lights, to illustrate two different braking sequences.

The illumination intensity L of the brake light is modulated in accordance with FIG. 7 not only at the beginning of the entire braking time $\Delta t_{Bro}$, that is to say, during the commencing braking time $\Delta t_{Brb}$, but also during the period of intensive braking $\Delta t_{Bri}$, this time being disposed between the times $t_x$ and $t_y$. The time $t_x$ corresponds to the limiting position at which the contact bar 12 may be lifted from the contact 15 and the time $t_y$ corresponds to the moment of time at which the contact bar 12 once again bears on the contact 15. At the beginning of the braking operation, the brake lights will be illuminated until the time $t_o$ and will be extinguished at the end of the braking operation at the time $t_E$. It may also be appropriate at the end of the time relating to intensive braking, namely, $\Delta t_{Bri}$ for the initial modulation $\Delta t_{Brb}$, normally already available at the commencement of braking, to be immediately repeated.

Figure 8:
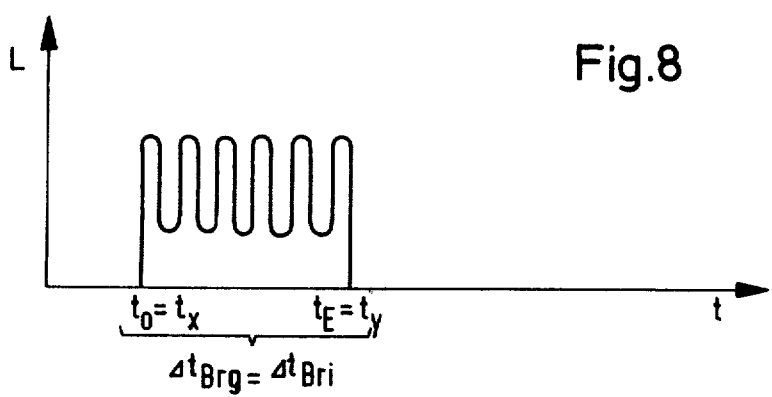

The illumination intensity according to FIG. 8 is modulated during the entire braking time $\Delta t_{Bro}$ since intensive braking takes place during this entire period of time. In this case, the time of intensive braking $\Delta t_{Bri}$ is at least partially superimposed on the time of commencing braking $\Delta t_{Brb}$.

Since the brake light modulator may be constructed as a small module, for example, in the form of a more or less integrated circuit, it is possible for the circuit system according to the invention to be subsequently fitted to conventional motor vehicles, in particular, since the switch, having a member which responds to deceleration, may also be subsequently installed. Incorporation into the conventional brake light circuit does not present any difficulty.

If the maximum possible deceleration obtained by the internal vehicle braking system has the value $-b_{max}$, it will be advantageous for the limiting position between normal and intensive braking to be set to approximately 50% of $-b_{max}$. Any other value may, of course, also be set if required.

In the embodiment of FIG. 9, the invention is applied to a dual-light or dual-color brake indicating system, wherein the brake-pedal switch 3 is connected in series to the circuit for conventional brake lights 1a-2a, colored red for example, to show a steady-state red-light display as long as switch 3 is closed. In addition, a second pair of brake lights 1'-2' is connected to a modulator package 4', having an inertially-responsive feature, as of the character already discussed at 4 in connection with FIGS. 1 and 2. The lights 1'-2' may also be red, but are preferably of different color, for example, green, blue or amber, to be more readily distinguished from the red indication produced by lights 1a- 2a.

In another application, the modulator package may be merely the inertially-operated switch of FIG. 6, wherein the terminals 16a-16b thereof are connected at 4a'-4b' in FIG. 9. In such case, the differently colored display at 1'-2' would appear as a steady-state signal, only for the duration of detection of deceleration of at least the predetermined magnitude required to close switch 10.

A still further application may utilize the transistorized circuit of FIG. 10, wherein many of the elements are recognizable from FIG. 2 and are given the same reference numbers. In FIG. 10, however, the inertially-operated switch means 10 is arranged, normally open, in the supply-line connection between resistors $R_4$-$R_7$ and resistor $R_3$; and the latch-circuit function (attributed to capacitor $C_1$, FIG. 2) has been dispensed with. The circuit of FIG. 10 thus supplies cyclically modulated voltage to the auxiliary brake lights 1'-2' only for the duration of the period of time in which deceleration of at least the predetermined magnitude is detected by the inertially-responsive means 10.

As a further option, time-delay switch means 18 may be included in the package 4' but, for clarity, is separately shown in FIG. 9a, with external connections 18a-18b to be made at 4a'-4b'. The switch means 18 is of the normally closed variety, meaning that closure of the brake switch 3 will pass initial current to the auxiliary brake lights 1'-2'; at the same time, the delay in switch means 18 is "timed out" as preferably a relatively short period of time (corresponding, say, to the time up to latching in the circuit of FIG. 2), at which point the closure of terminals 4a'-4b' via means 18 is opened. In this circumstance, the lights 1'-2' will provide a clear, initial, brief "brake-on" indication, followed by further indications only if the predetermined deceleration magnitude is detected. The circuit of FIG. 9 (thus modified to include the element 18) will thus be understood to demonstrate optional initial operation of the "other color" lights 1'-2' by a short timed-out steady state signal via switch 18 or by the cyclically modulated latch-determined short pulse train described in connection with the modulator of FIG. 2.

FIG. 11 graphically illustrates some of the above-described functions, on separate $a$ and $b$ axes and for the same time base, showing at $a$ a typical red-indicating brake-light operation for the lights $1a$-$2a$ of FIG. 9. At $b$ is shown the other-color operation of lights $1'$-$2'$, for the initial brake-on period $t_0$-1, timed-out by means 18, and followed by an assumed "intensive-braking" period $t_2$-$t_3$ of further other-color operation, wherein the indication for period $t_2$-$t_3$ is assumed to be produced, steady-state, by the switch means of FIG. 6. It will be understood that cyclic modulation, in the event of using the circuit of FIG. 10, would produce, at $t_2$-$t_3$ (or, if desired, also at $t_0$-$t_1$) a characteristic modulation, as previously described.

Although the present invention has been described in conjunction with preferred embodiments, it is to be understood that modifications and variations may be resorted to without departing from the spirit from the spirit and scope of the invention as those skilled in the art will readily understand. Such modifications and variations are considered to be within the purview and scope of the invention.

For example, FIG. 12 illustrates a circuit as in FIG. 1 but modified to produce the kind of pulsed excitation described in connection with FIG. 5, and using the same inertially operated brake-light modulating means 4 as already described. In FIG. 12, there is shown, at 17, means including a transformer for accepting the pulse output of means 4 and translating the same into pulses of greater peak amplitude than the level provided by source 5. A separate connection to terminal $4a$ suggests that the transformed output is with respect to a battery-bias level $U_x$, so that transformer output swings are above and below the bias level $U_x$, as shown.

What is claimed is:

1. In a motor-vehicle brake-light circuit system, a brake-switch operated voltage-source connection, at least two brake lights of different colors, a first brake-light output connection of said switch-operated voltage connection to a first-colored one of said lights, and a second brake-light output connection of said switch-operated voltage connection to a second-colored one of said lights; said second output connection being connected to control means including delay-determining means responsive to brake-switch actuation to determine a delayed interval of time following such an actuation, and said control means including signal-generator means producing one characteristic output signal for the duration of said delayed interval and a second characteristic output signal after completion of said interval.

2. The system of claim 1, in which said signal-generator means includes a modulator of cyclic frequency producing one of said signals.

3. The system of claim 1, in which said delay-determining means includes inertially-operated means operatively connected to determined said interval.

4. The system of claim 3, in which said inertially-operated means is operatively connected to determine a second interval of time following said delayed interval and as long as a predetermined magnitude of deceleration is detected.

5. The system of claim 3, in which said control means is contained in a unitary package which includes an externally visible directional indicium correlated as to orientation with the direction of deceleration response of said inertially-operated means.

6. The system of claim 1, in which said signal-generator means produces one of said signals as a steady-state signal.

7. The system of claim 2, in which the other of said signals is a steady-state signal for the duration of brake operation.

8. The system of claim 3, in which said delay-determining means includes timing means connected to said input-connection means and responsive to excitation of said input connection to determine a relatively short predetermined interval of time following brake-switch actuation, and in which said one signal includes a first component timed by said timing means and a second component determined solely by the period of time for which at least a predetermined magnitude of deceleration is detected by said inertially-operated means.

9. The system of claim 8, in which said signal-generator means includes a modulator of cyclic frequency, said modulator being connected for operation during both components of said one signal.

10. The system of claim 1, in which said colors are red and green, respectively.

11. The system of claim 1, in which said signal-generator means includes aa modulator of cyclic frequency, and in which said modulator supplies output voltage modulated between maximum and minimum values which are respectively above and below the voltage-output level for said first brake-light output connection.

12. The system of claim 1, in which said signal-generator means includes means determining a fixed period of time as such delayed interval.

13. In a motor-vehicle brake-light circuit system, a brake-switch operable voltage-source connection, two separate brake-light output-connection means for independent brake-switch operation of two separate brake lights, and voltage-control means connected to said voltage-source connection and to said output-connection means; said control means including means connected to said voltage-source connection and responsive to brake-switch actuation to determine a delayed interval of time following such an actuation, signal-generator means producing one characteristic output signal determined at least in part by the end of said interval of time and a second characteristic output signal independent of said interval, one of said output-connection means being connected for supply of said one output signal to one brake light and the other of said output-connection means being connected for supply of said second output signal to another brake light.

14. In a motor-vehicle brake-light circuit system, a brake-Switch operated voltage-source connection, a brake-light system having at least two-color capability, a first brake-light output connection of said switch-operated voltage connection to a said system to determine a first-colored display actuation of said system, and a second brake-light output connection to said system to determine a second-colored display acuation of said system; at least one of said output connections being connected to control means including delay-determining means responsive to brake-switch actuation to determine a delay interval of time following such an actuation, and said control means including signal-generator means producing one characteristic output signal for a first-colored display actuation of said system for the duration of said delayed interval and a second characteristic output signal for a second-colored display actuation of said system after completion of said interval.

* * * * *